(12) United States Patent
Fukuda

(10) Patent No.: US 8,215,711 B2
(45) Date of Patent: Jul. 10, 2012

(54) VEHICULAR SEAT

(75) Inventor: Tomokazu Fukuda, Toyota (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 159 days.

(21) Appl. No.: 12/739,966

(22) PCT Filed: Jun. 19, 2008

(86) PCT No.: PCT/JP2008/061204
§ 371 (c)(1),
(2), (4) Date: Jul. 8, 2010

(87) PCT Pub. No.: WO2009/069331
PCT Pub. Date: Jun. 4, 2009

(65) Prior Publication Data
US 2010/0283302 A1    Nov. 11, 2010

(30) Foreign Application Priority Data
Nov. 29, 2007    (JP) ................ 2007-308678

(51) Int. Cl.
*A47C 1/023* (2006.01)
*F16M 13/00* (2006.01)
(52) U.S. Cl. .............. 297/344.11; 248/429; 248/430
(58) Field of Classification Search .......... 297/344.11; 248/429, 430
See application file for complete search history.

(56) References Cited

U.S. PATENT DOCUMENTS

| | | | | |
|---|---|---|---|---|
| 4,384,701 A * | 5/1983 | Barley | ............ | 248/430 X |
| 4,652,052 A * | 3/1987 | Hessler et al. | ............ | 248/430 X |
| 4,730,804 A * | 3/1988 | Higuchi et al. | ............ | 248/429 |
| 4,781,354 A * | 11/1988 | Nihei et al. | ............ | 248/429 |
| 5,082,228 A * | 1/1992 | Shimazaki | ............ | 248/430 |
| 5,322,348 A * | 6/1994 | Johnson | ............ | 248/430 X |
| 5,882,074 A * | 3/1999 | Kojima | ............ | 248/429 X |
| 6,328,272 B1* | 12/2001 | Hayakawa et al. | ............ | 248/429 |
| 7,677,664 B2* | 3/2010 | Beneker et al. | ............ | 297/344.11 |
| 2005/0247846 A1* | 11/2005 | Jeong | ............ | 248/429 |
| 2007/0120407 A1* | 5/2007 | Kojima | ............ | 297/344.11 |
| 2009/0302633 A1 | 12/2009 | Kuno | | |
| 2010/0007167 A1 | 1/2010 | Ito et al. | | |
| 2010/0109404 A1 | 5/2010 | Yamagishi et al. | | |

FOREIGN PATENT DOCUMENTS

| | | |
|---|---|---|
| JP | 11-099856 | 4/1999 |
| JP | 11-099857 | 4/1999 |
| JP | 2001-001809 | 1/2001 |
| JP | 2004-122825 | 4/2004 |

* cited by examiner

*Primary Examiner* — Rodney B White
(74) *Attorney, Agent, or Firm* — Greenblum & Bernstein P.L.C.

(57) ABSTRACT

A vehicular seat can include a pair of right and left slide devices, right and left lock mechanisms, and a synchronous releasing mechanism releasing the right and left lock mechanisms in synchronism with each other. The synchronous releasing mechanism can include a rod whose both end portions are rotatably mounted between upper portions of right and left side frames of a seat cushion, right and left levers mounted to portions of the rod near both end portions thereof so as to be incapable of rotating with respect to the rod, and right and left connection members connecting the right and left levers and the right and left lock mechanisms to each other. Clearance portions can be included between the right and left levers and the right and left connection members, to prevent the connection members from moving so as to release the lock mechanisms in synch with the levers when the side frames are downwardly crushed, and the rod and the levers move downwards.

4 Claims, 5 Drawing Sheets

VEHICULAR SEAT

TECHNICAL FIELD

The present invention relates to a vehicular seat slidably mounted to a floor.

BACKGROUND ART

Generally speaking, a vehicular seat slidably mounted to a floor has a pair of right and left slide devices, right and left lock mechanisms locking the right and left slide devices, right and left lock releasing mechanisms releasing the lock of the right and left lock mechanisms, and an operating member operated when operating the lock releasing mechanisms (See JP 2004-122825 A). The operating member is arranged, for example, below the front side of a seat cushion, and is of a loop configuration looped up on the front side of the seat cushion. And, both end portions of the operating member are connected to the right and left lock releasing mechanisms, and the right and left lock releasing mechanisms are operated in synchronism with each other through the operation of the operating member.

It should be noted, however, that the operating member of a loop configuration extends near the floor and on the front side of the seat cushion. Thus, it is not easy to secure a space below the seat cushion and near the floor. Further, it is desirable for a vehicular seat to be excellent in terms of safety at the time of collision of the vehicular. Thus, there is a need in the art to provide a vehicular seat which helps to easily secure a space below the seat cushion and near the floor, and which excels in safety.

SUMMARY

One aspect of the present invention is that the vehicular seat is provided with a synchronous releasing mechanism which operates the right and left lock releasing mechanisms in synchronism with each other. The synchronous releasing mechanism has a rod whose both end portions are rotatably mounted between upper portions of right and left side frames of a seat cushion, right and left levers mounted to the portions of the rod near both end portions thereof so as to be incapable of rotating with respected to the rod, and right and left connection members connecting the right and left levers and the right and left lock mechanisms to each other. And, between the right and left levers and the right and left connection members, there are formed clearance portions which, when the side frames are downwardly crushed, and the rod and the levers move downwards, help to prevent the connection members from moving in synchronization with the levers so as to release the lock mechanisms.

Thus, according to this aspect, the rod is mounted to the upper portions of the right and left side frames. As a result, it is possible to easily secure a space below the seat cushion and near the floor. When the vehicular undergoes collision (forward collision) and the side frames are crushed by the load of the occupant, etc., both the rod and the levers can move downwardly together with the side frames; however, due to the clearance portions, the connection members do not move in synchronization with the levers. Thus, it is possible to reliably prevent the lock mechanisms from being released at the time of collision.

Another aspect of the present invention is that the levers have connection holes to which end portions of the connection members are connected. The connection holes are formed in an arcuate configuration, and have, in the state in which the lock mechanisms are locked, the clearance portions above the end portions of the connection members, with the end portions being capable of moving to the clearance portions. Thus, according to this aspect, the clearance portions can be formed by part of the connection holes formed in the levers.

Still another aspect of the present invention is that an anchor of a seat belt is mounted to one of the right and left side frames. The lever situated on the one side frame side has a connection hole to which an end portion of the connection member is connected. And, the connection hole is formed in an arcuate configuration, and has, in the state in which the lock mechanisms are locked, a play portion below the end portion of the connection member, with the end portion being capable of moving to the play portion; when the anchor is pulled upwards and the seat undergoes deformation, the end portion of the connection member can move to the play portion. Thus, according to this aspect, when, at the time of collision of the vehicular, the seat belt is pulled hard and the anchor is pulled upwards to thereby cause the seat to be twisted, the end portion of the connection member can move to the play portion of the lever. Thus, it is possible to prevent the connection member from moving in synchronization with the lever, thereby preventing the lock mechanisms from being released.

A further aspect of the present invention is that the side frames are of a plate-like configuration, and constitute side wall portions of the seat cushion. And, the lower end portions thereof are mounted to slide devices. Thus, according to this aspect, the side frames have a vertical length from a position near the floor to a position near the upper surface of the seat cushion. Thus, the distance by which the side frames are downwardly crushed can be relatively long; however, even when the side frames are crushed, it is possible to prevent the lock mechanisms from being released due to the clearance portions.

BEST MODE FOR CARRYING OUT THE INVENTION

Figure 1:
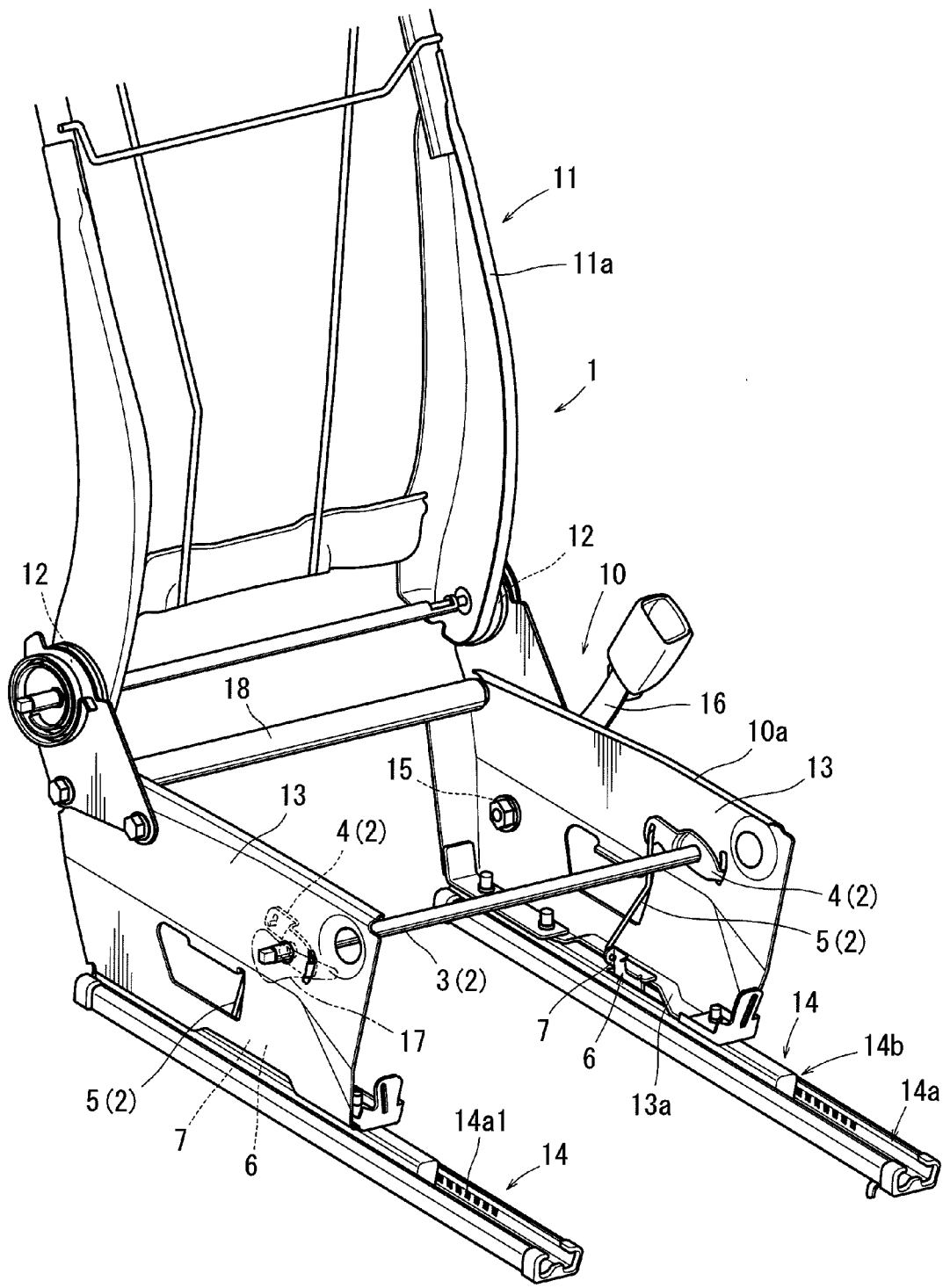
FIG. 1 is a perspective view of a frame structure of a vehicular seat.

An embodiment of the present invention will be described with reference to FIGS. 1 to 6. As shown in FIG. 1, a seat 1 is a seat of a vehicular such as an automobile, and has a seat cushion 10, a seat back 11, and slide devices 14. The seat cushion 10 and the seat back 11 have frames 10a and 11a, and pads (not shown) attached to the frames 10a and 11a. The frames 10a and 11a are connected together by reclining devices 12 so as to allow angular adjustment.

As shown in FIG. 1, the frame 10a of the seat cushion 10 has a pair of right and left side frames 13, and a reinforcing rod 18 connecting rear upper portions of the side frames 13 to each other. The side frames 13 are of a plate-like configuration, and constitute side wall portions of the seat cushion 10, with lower end portions 13a thereof being mounted to the slide devices 14. One side frame 13 is arranged on a vehicular center side, and the other side frame 13 is arranged on a vehicular outer side. An anchor 15 is mounted to a rear lower portion of the side frame 13 on the vehicular center side. And, a seat belt 16 is attached to the anchor 15.

Figure 6:
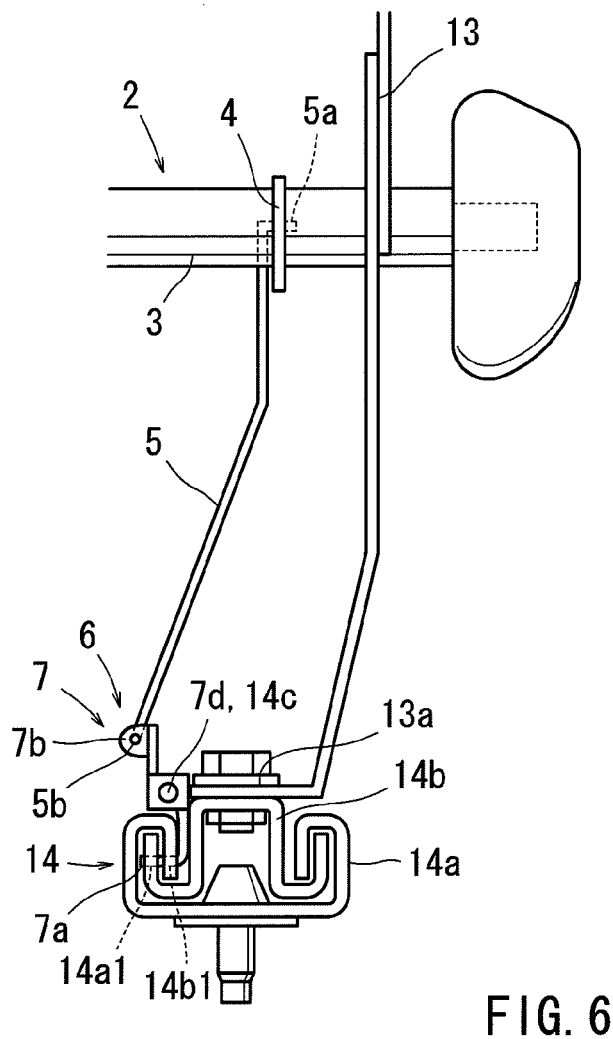
FIG. 6 is a sectional view taken along the arrow line VI-VI of FIG. 4.

The slide devices 14 are devices retaining the seat 1 slidably with respect to a floor; as shown in FIGS. 1 and 6, they extend in the longitudinal direction of the vehicular. Each slide device 14 has a lower rail 14a mounted to the floor, an upper rail 14b slidably assembled to the lower rail 14a, and a lock mechanism 6 releasably locking them together. The lower end portions 13a of the side frames 13 are mounted to the upper portions of the upper rails 14b.

Figure 5:
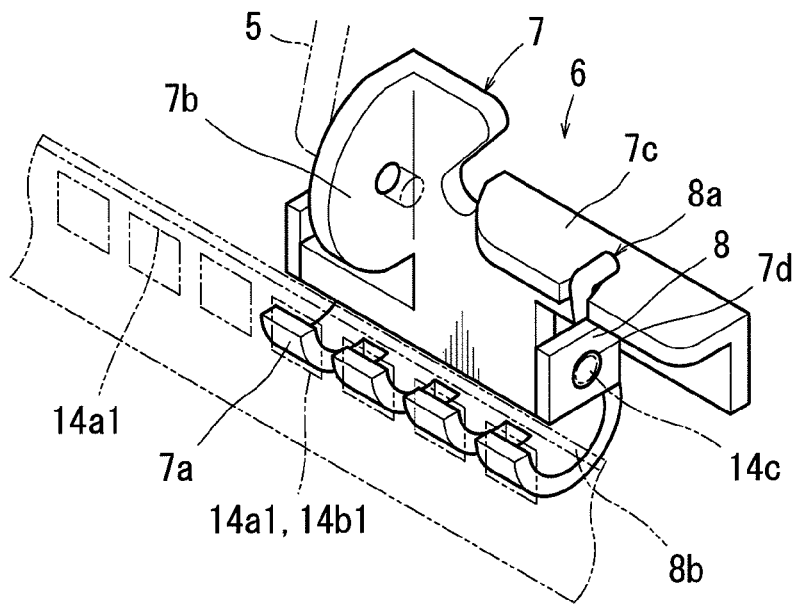
FIG. 5 is a perspective view of a lock mechanism.

As shown in FIGS. 5 and 6, each lock mechanism 6 has a lock member 7 and a spring 8. Each lock member 7 has a plurality of lock claws 7a at the lower end portion thereof, and a recess 7d at the proximal end portion of the lock claws 7a. A protrusion 14c formed on the upper rail 14b is inserted into the recess 7d, whereby the lock members 7 are mounted to the upper rails 14b so as to be tiltable around the protrusions 14c.

As shown in FIGS. 5 and 6, a connecting portion 7b and a latching portion 7c are formed on the upper portion of each lock member 7. A connection member 5 is connected to the connecting portion 7b. The spring 8 biasing the lock member 7 in the locking direction is mounted between the latching portion 7c and the upper rail 14b. The lower rails 14a and the upper rails 14b have holes 14a1, 14b1 into which the lock claws 7a are inserted. And, a plurality of holes 14a1 are provided side by side along each lower rail 14a. Thus, by causing the upper rails 14b to slide to a desired position with respect to the lower rails 14a and inserting the lock claws 7a into the holes 14a1 and 14b1, the upper rails 14b can be locked at a desired position with respect to the lower rails 14a.

Figure 2:
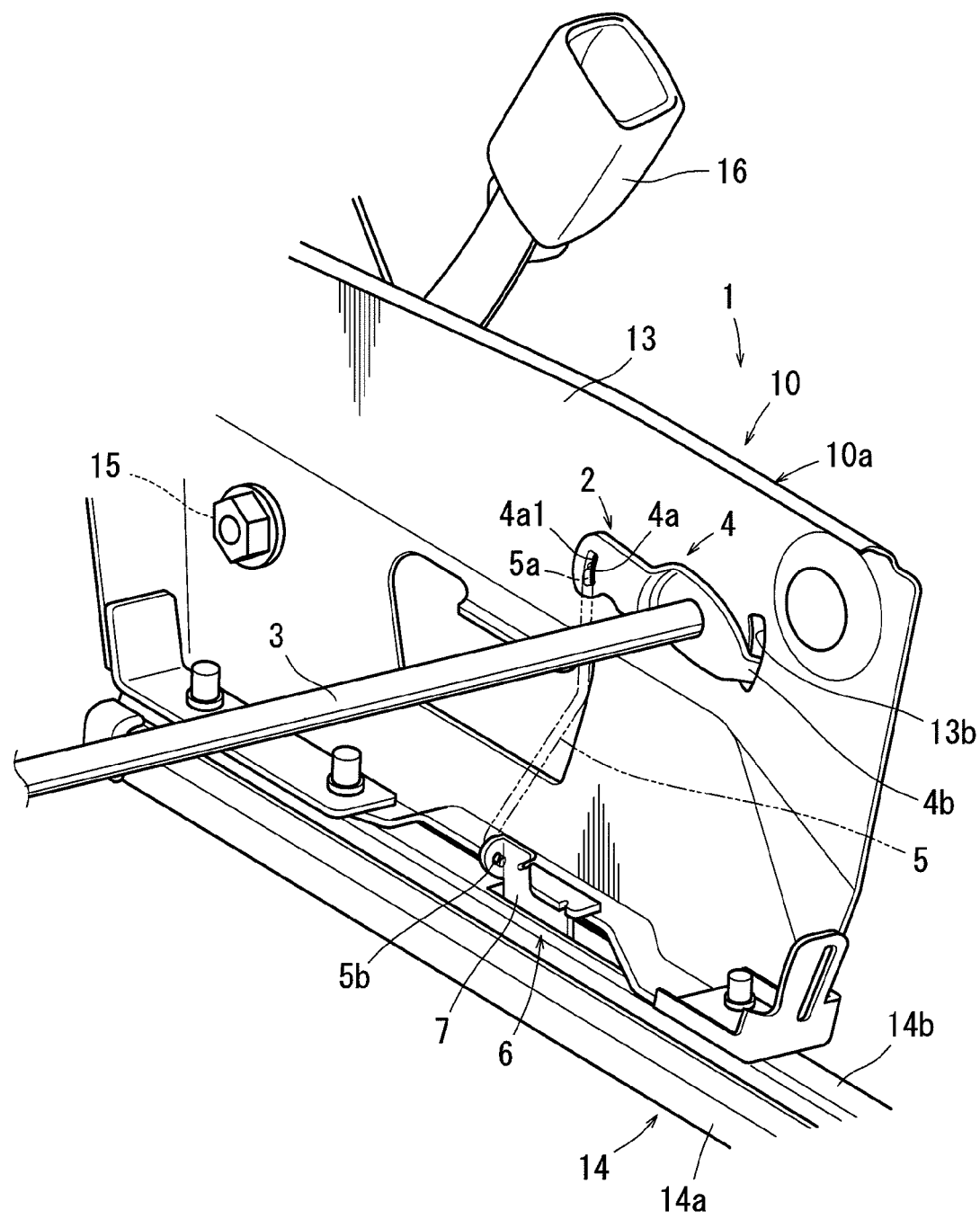
FIG. 2 is a partial enlarged view of FIG. 1.

As shown in FIGS. 1 and 2, mounted to the side frames 13 are a synchronous releasing mechanism 2 synchronously releasing the lock of the right and left lock mechanisms 6, and an operating member 17 operated at the time of releasing the lock of the lock mechanisms 6. The synchronous releasing mechanism 2 has a rod 3, levers 4 mounted to the portions of the rod 3 near the right and left ends thereof, and the connection members 5 connecting the levers 4 and the lock members 7 to each other. Both end portions of the rod 3 are mounted between front upper portions of the right and left side frames 13 so as to be capable of axial rotation.

Figure 3:
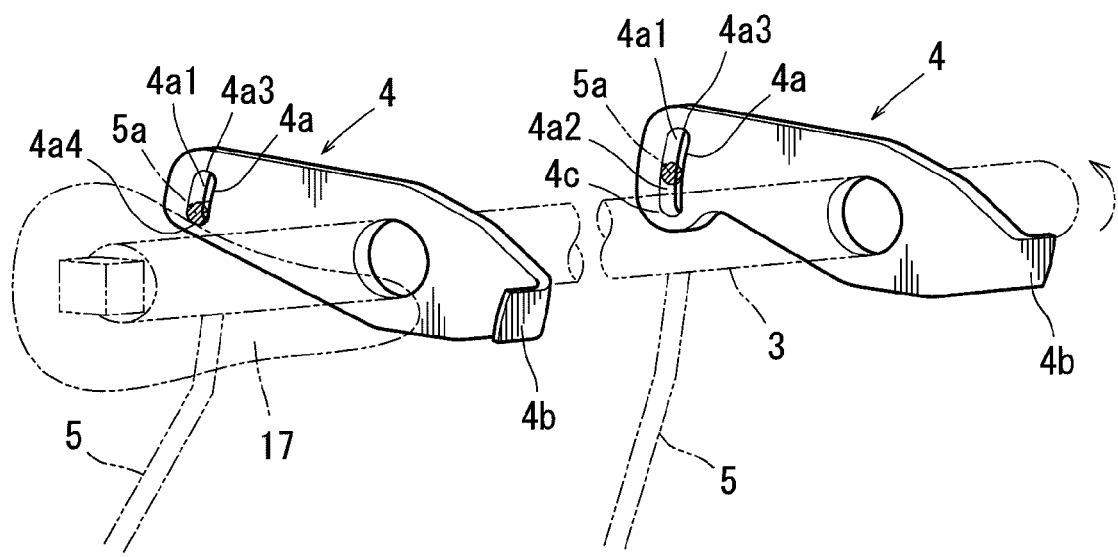
FIG. 3 is a perspective view of members constituting part of a synchronous releasing mechanism.
Figure 4:
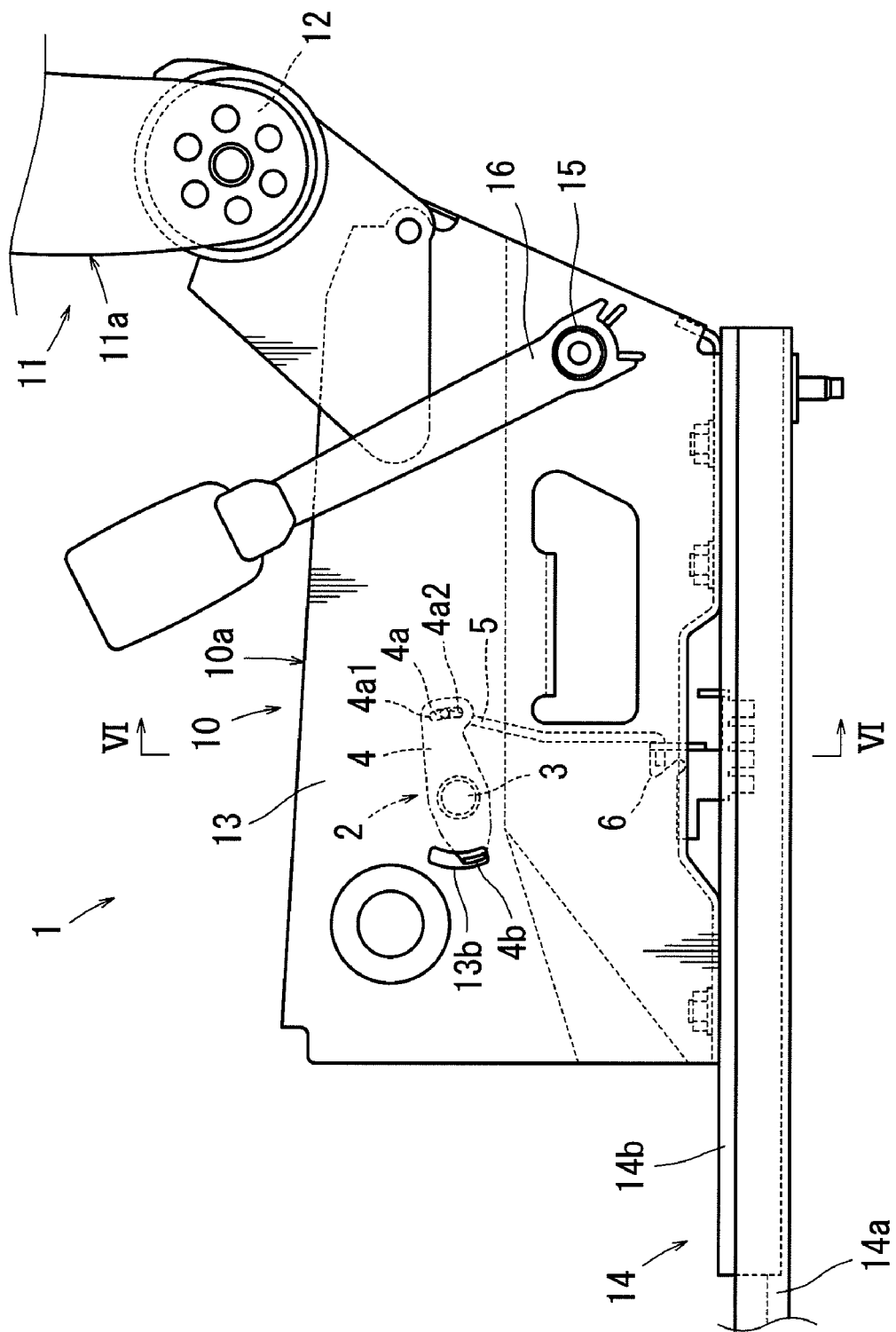
FIG. 4 is a partial side view of the frame structure of the vehicular seat.

As shown in FIGS. 3 and 4, the levers 4 are mounted to the portions of the rod 3 near the right and left ends thereof so as to be incapable of rotation. Each lever 4 extends in the longitudinal direction of the vehicular, and has a connection hole 4a in the rear portion thereof. And, each lever 4 has a stopper claw 4b at the front portion thereof. Each stopper claw 4b is inserted into an arcuate guide groove 13b formed in each side frame 13. Thus, the tilting amount of the levers 4 is regulated by the guide grooves 13b and the stopper claws 4.

As shown in FIGS. 3 and 4, the connection holes 4a are formed in an arcuate configuration extending around the rod 3. Upper end portions 5a of the connection members 5 are inserted into the connection holes 4a, and engaged thereto. And, clearance portions 4a1 are formed above the upper end portions 5a. In the state in which the lock mechanisms 6 are locked, the clearance portions 4a1 keep the portions above the upper end portions 5a open. Thus, while the rod 3 and the levers 4 move downwards when the side frames 13 are downwardly crushed by the weight of the occupant or the like at the time of collision of the vehicular, the upper end portions 5a of the connection members 5 move to the clearance portions 4a1, so that the connection members 5 do not move in synchronization with the levers 4.

As shown in FIGS. 3 and 4, the connection hole 4a of the lever 4 arranged on the vehicular center side extends downwardly longer than that of the lever 4 arranged on the vehicular outer side. And, to enable the connection hole 4a to extend downwardly longer, the corresponding lever 4 has a protruding portion 4c protruding downwardly. Thus, the connection hole 4a of the lever 4 on the vehicular center side has a play portion 4a2 below the upper end portion 5a of the connection member 5. And, in the state in which the lock mechanisms 6 are locked, the play portion 4a2 keeps the portion below the upper end portion 5a open, allowing the upper end portion 5a to move downwards with respect to the lever 4.

As shown in FIGS. 4 and 6, the connection members 5 are wires consisting of metal bars. The upper end portions 5a of the connection members 5 are engaged to the connection holes 4a of the levers 4, with the tip end portions thereof being crushed. Thus, due to the crushed portions, the upper end portions 5a are prevented from being detached from the connection holes 4a. Lower end portions 5b of the connection members 5 are inserted into the connecting portions 7b of the lock members 7 to be connected thereto.

As shown in FIGS. 1 and 3, the operating member 17 is mounted to one end portion of the rod 3 so as to be incapable of rotation. Thus, by upwardly pulling the front portion of the operating member 17, the rod 3 is rotated in the direction of the arrow in FIG. 3. As a result, the right and left levers 4 are tilted together with the rod 3. And, upper end portions 4a3 of the connection holes 4a push down the upper end portions 5a of the connection members 5, and the connection members 5 press the lock members 7 as shown in FIGS. 5 and 6. As a result, the lock members 7 are tilted against the biasing force of the springs 8, and the lock claws 7a are extracted from the holes 14a1 and 14b1. In this way, the upper rails 14b are made slidable with respect to the lower rails 14a, and the seat 1 is made slidable with respect to the floor.

As described above, the synchronous releasing mechanism 2 has the rod, the right and left levers 4, and the right and left connection members 5 as shown in FIGS. 1 and 2. And, the clearance portions 4a1 are formed between the right and left levers 4 and the right and left connection members 5. And, the rod 3 is mounted to the upper portions of the right and left side frames 13. Thus, it is easy to secure a space below the seat cushion 10 and near the floor. Further, while the rod 3 and the levers 4 can move downwards when the side frames 13 are crushed by the load of the occupant or the like at the time of collision (forward collision) of the vehicular, the connection members 5 do not move in synchronization with the levers 4 due to the clearance portions 4a1. Thus, it is possible to reliably prevent the lock of the lock mechanisms 6 from being released at the time of collision.

Further, as shown in FIG. 3, the levers 4 have the connection holes 4a. And, the connection holes 4a are formed in an arcuate configuration, and have, above the upper end portions 5a of the connection members 5, the clearance portions 4a1 to which the upper end portions 5a thereof can move. Thus, the clearance portions 4a1 can be formed by part of the connection holes 4a formed in the levers 4.

As shown in FIG. 1, the anchor 15 is mounted to one of the right and left side frames 13. The lever 4 situated on the one side frame 13 side has the connection hole 4a. And, as shown in FIG. 3, the connection hole 4a is formed in an arcuate configuration, and has, below the upper end portion 5a of the connection member 5, the play portion 4a2 to which the upper end portion 5a can move. Thus, when, at the time of collision of the vehicular, the seat belt 16 is pulled hard, and the anchor 15 is pulled upwardly to cause the seat 1 to be twisted, the upper end portion 5a of the connection member 5 can move to the play portion 4a2 side. Thus, it is possible to prevent the connection member 5 from moving in synchronization with the lever 4, thereby preventing the lock of the lock mechanisms 6 from being released.

As shown in FIG. 2, the side frames 13 are of a plate-like configuration, and constitute the side wall portions of the seat cushion 10. And, their lower end portions are mounted to the slide devices 14. Thus, the side frames 13 have a vertical length from a position near the floor to a position near the upper surface of the seat cushion 10. Thus, the distance by which the side frames 13 are downwardly crushed is relatively long. However, even when the side frames 13 are crushed, it is possible to prevent the lock of the lock mechanisms 6 from being released due to the clearance portions 4a1.

As shown in FIGS. 3 and 4, the levers 4 have the stopper claws 4b. And, the lever 4 situated on the vehicular outer side has the connection hole 4a but no play portion 4a2. Thus, when the front end portion of the operating member 17 is erroneously pushed down, the stopper claw 4b reaches the lower end portion of the guide groove 13b, and a lower end portion 4a4 of the connection hole 4a on the vehicular outer side reaches the upper end portion 5a of the connection member 5, and its movement is regulated. Thus, the tilting amount of the lever 4 can be regulated by the stopper claw 4b and the connection hole 4a on the vehicular outer side. Further, the lever 4 on the vehicular outer side has no protruding portion 4c, thereby achieving a reduction in weight.

The present invention is not restricted to the above embodiment; it is also possible to adopt the following configurations.

(1) Each of the side frames 13 of the above embodiment consists of a single plate. However, it is also possible to adopt, for example, a configuration in which each side frame is composed of an upper plate portion, a lower plate portion, and a connection leg connecting the upper and lower plate portions to each other, with the rod being mounted to the upper plate portions.

(2) In the above embodiment, the clearance portions 4a1 are formed in the levers 4. However, it is also possible to adopt a configuration in which the clearance portions are formed on the connection member side. For example, it is also possible to adopt a configuration in which protrusions are provided on the levers, and in which the connection members are provided with arcuate connection holes into which the protrusions are inserted, with the clearance portions being formed by part of the connection holes.

(3) In the above embodiment, the play portion 4a2 is formed in the lever 4. However, it is also possible to adopt a configuration in which the play portion is formed on the connection member side. For example, it is also possible to adopt a configuration in which the protrusion is provided on the lever and in which an arcuate connection hole into which the protrusion is inserted is provided in the connection member, with the play portion being formed by part of the connection hole.

(4) In the above embodiment, the lever 4 on the vehicular center side has the play portion 4a2. However, it is also possible to adopt a configuration in which that lever has no play portion. Alternatively, it is also possible to adopt a configuration in which both the lever on the vehicular center side and the lever on the vehicular outer side respectively have play portions.

(5) In the above embodiment, the levers 4 have the connection holes 4a in the rear portions thereof on the rear side of the rod 3. However, it is also possible to adopt a configuration in which the levers have the connection holes in the front portions thereof on the front side of the rod. In this case, the operating member is rotated in a direction reverse to that of the operating member 17 of the above embodiment.

The invention claimed is:

1. A vehicular seat comprising:
a pair of right and left slide devices slidably retaining a seat cushion on a floor;
right and left lock mechanisms locking the right and left slide devices; and
a synchronous releasing mechanism releasing the right and left lock mechanisms in synchronism with each other, wherein:
the synchronous releasing mechanism has a rod whose both end portions are rotatably mounted between upper portions of right and left side frames of the seat cushion, right and left levers mounted to portions of the rod near both end portions thereof to be incapable of rotating with respect to the rod and right and left connection members connecting the right and left levers and the right and left lock mechanisms to each other, and
between the right and left levers and the right and left connection members, clearance portions are formed preventing the connection members from moving so as to release the lock mechanisms in synchronization with the levers when the side frames are downwardly crushed, and the rod and the levers move downwards,
wherein the levers have connection holes to which end portions of the connection members are connected; and
the connection holes are formed in an arcuate configuration, and, in the state in which the lock mechanisms are locked, have the clearance portions above the end portions of the connection members, with the end portions being capable of moving to the clearance portions.

2. The vehicular seat as in claim 1, wherein the side frames are plate shaped members and constitute side wall portions of the seat cushion, with lower end portions of the side frames being mounted to the slide devices.

3. A vehicular seat comprising:
a pair of right and left slide devices slidably retaining a seat cushion on a floor;
right and left lock mechanisms locking the right and left slide devices; and
a synchronous releasing mechanism releasing the right and left lock mechanisms in synchronism with each other, wherein:
the synchronous releasing mechanism has a rod whose both end portions are rotatably mounted between upper portions of right and left side frames of the seat cushion, right and left levers mounted to portions of the rod near both end portions thereof to be incapable of rotating with respect to the rod, and right and left connection members connecting the right and left levers and the right and left lock mechanisms to each other, and
between the right and left levers and the right and left connection members, clearance portions are formed preventing the connection members from moving so as to release the lock mechanisms in synchronization with the levers when the side frames are downwardly crushed, and the rod and the levers move downwards,
wherein an anchor of a seat belt is mounted to one of the right and left side frames; and
the lever situated on the one side frame side has a connection hole to which an end portion of the connection member is connected, and the connection hole is formed in an arcuate configuration, and, in the state in which the lock mechanisms are locked, has, below the end portion of the connection member, a play portion to which the end portion can move, with the end portion of the connection member being allowed to move to the play portion when the anchor is pulled upwardly to cause deformation of the seat.

4. The vehicular seat as in claim 3, wherein the side frames are plate shaped members and constitute side wall portions of the seat cushion, with lower end portions of the side frames being mounted to the slide devices.

* * * * *